US005846014A

United States Patent [19]
Arthur et al.

[11] Patent Number: 5,846,014
[45] Date of Patent: Dec. 8, 1998

[54] RESILIENT JOINT

[75] Inventors: David Hamilton Arthur, Belgrave Heights; Kenneth Stefan Karcz, Croydon North, both of Australia

[73] Assignee: Empire Rubber (Australia) PTY. LTD., Victoria, Australia

[21] Appl. No.: 646,591

[22] Filed: May 8, 1996

[51] Int. Cl.$^6$ .................................................. F16B 11/00
[52] U.S. Cl. ............................. 403/2; 105/139; 264/262; 264/265; 403/222; 403/269; 403/291
[58] Field of Search ..................... 105/133, 138, 105/139; 264/261, 262, 265; 403/2, 220, 221, 222, 228, 265, 266, 268, 269, 291

[56] References Cited

U.S. PATENT DOCUMENTS

| | | | |
|---|---|---|---|
| 1,890,278 | 12/1932 | Bedur | 403/222 X |
| 1,958,141 | 5/1934 | Haushalter | 264/262 X |
| 2,358,518 | 9/1944 | Kraft | 403/221 X |
| 2,584,133 | 2/1952 | Koochembere | 403/265 X |
| 2,689,755 | 9/1954 | Krotz | 403/221 |
| 2,927,786 | 3/1960 | Templeton | 403/221 X |
| 3,315,555 | 4/1967 | Travilla | 403/220 X |
| 3,358,065 | 12/1967 | Enders | 264/262 |
| 4,129,394 | 12/1978 | Eichinger et al. | 403/221 X |
| 4,638,608 | 1/1987 | Coy | 403/2 X |
| 5,205,029 | 4/1993 | De Antonio et al. | 264/262 X |
| 5,413,374 | 5/1995 | Pierce | 403/222 X |

FOREIGN PATENT DOCUMENTS 390197 3/1933 United Kingdom ................... 403/222

Primary Examiner—Kenneth J. Dorner
Assistant Examiner—Andrea Chop
Attorney, Agent, or Firm—Ladas & Parry

[57] ABSTRACT

A casing for use in the manufacture of a resilient joint, the casing having an outer surface and an inner surface, the inner surface defining an internal cavity, wherein the casing has at least one frangible wall section which is adapted to fracture upon the application of a compressive force to the outer surface of the casing such that after such fracture the volume of the internal cavity of the casing is reduced.

24 Claims, 3 Drawing Sheets

RESILIENT JOINT

The present invention relates to an external casing for use in the manufacture of a resilient joint, a method of making a resilient joint and a resilient joint made by this method. The invention particularly relates to a resilient joint for mounting one component to another and damping relative movement between the two components.

BACKGROUND OF THE INVENTION

Resilient joints of the type used in railway car bogies typically comprise a cylindrically shaped outer steel casing having a cylindrical internal passage opening at both ends of the casing, the passage being occupied by a connecting steel member extending through the passage and beyond each end of the casing and a sleeve of rubber or other elastic material bonded to the connecting member and the surface of the passage. The ends of the connecting member are connected to two points in the railway car bogie that can move relative to each other and the resilient joint acts to damp this movement. For example the resilient joint can connect an arm with an axle or an electric motor to a chassis. Typically in this type of resilient joint the portion of the connecting member located within the internal passage is partially spherical in shape and the surfaces of the passage also have a spherical shape. This arrangement allows the resilient joint to absorb and damp forces applied along the axis of the connecting member as well as at an angle to this axis.

Such an outer casing has two diameters—an internal diameter which is the diameter of the passage and an external diameter which is the external or outer diameter of the casing.

To manufacture such a resilient joint, the internal member is located in the passage of the casing and rubber material is injected into the space between the internal member and the surface of the passage to fill the passage. The rubber bonds to the internal member and the surface of the passage and shrinks as it cures. The rubber typically shrinks by about 2.5%. This places tension on the rubber which is undesirable as this reduces the service life of the rubber and hence the resilient joint. To overcome this problem, manufacturers have in the past cut the outer casing into a number of segments prior to the rubber injection operation. Spacing means are then inserted between the segments to hold them slightly apart. The internal member is located in the passage of the casing and rubber is injected into the passage as noted above. The spacing means are then removed from between the segments of the casing allowing the segments to move together as the rubber shrinks during curing. Thus the inner diameter of the casing reduces as the rubber shrinks so that the rubber is not in a state of tension when it is cured.

There are however a number of disadvantages with this manufacturing method. It is difficult to cut the casing in the precise locations to form segments having the same dimensions. Therefore segments from different casings cannot be interchanged to form a completed casing. Accordingly the segments from the one casing must be kept together as a matched set during the entire manufacturing process. The use of spacing means adds to the manufacturing costs of the resilient Joint and requires the additional steps of arranging the spacing means and segments together to form a unit and removal of the spacing means after the injection step. Finally, it is noted that the segments must be exactly aligned during the injection step to achieve a properly shaped casing The applicants have appreciated that it would be advantageous to maintain the outer casing as an integral unit before and during the injection process so as to overcome the disadvantages of the prior art noted above, yet still be able to produce a resilient joint having a rubber component that is not in a state of tension.

The applicants have found that this can be achieved by providing one or more frangible wall sections in a casing having an internal cavity. During the manufacture of the resilient joint and after rubber has been injected into the internal cavity a compressive force is applied to the outside of the casing to fracture the frangible wall section or sections and reduce the volume of the internal cavity. This reduces any tension in the elastomeric material in the internal cavity.

SUMMARY OF THE INVENTION

Accordingly in this aspect, the present invention provides a casing for use in the manufacture of a resilient joint, said casing having an outer surface and an inner surface, the inner surface defining an internal cavity, wherein the casing has at least one frangible wall section which is adapted to fracture upon the application of a compressive force to the outer surface of the casing such that after said fracture the volume of the internal cavity of the casing is reduced. Here and elsewhere in this specification any reference to the internal cavity of the casing Is that volume defined by the inner surface of the casing whether filled with other material or not.

DESCRIPTION OF THE PREFERRED EMBODIMENTS

In a preferred embodiment the casing has a first and second end and the internal cavity extends between the first and second end so as to form an internal passage.

Preferably the casing of the invention is a unitary structure such that the at least one frangible wall section is integral with the other parts of the casing.

In a further preferred embodiment there is at least one slot in the casing, said at least one slot having a base, and the at least one frangible wall section extending from the inner surface of the casing to the base of the slot. The slot may be longitudinal and may extend from the first end of the casing to the second end. In this embodiment the frangible wall section also extends from the first end to the second of the casing.

In an especially preferred embodiment there are at least two longitudinal slots in the casing with frangible wall sections extending from the base of each slot to the inner surface of the casing. In this way, the casing is broken into segments when a compressive force is applied to it. The more segments the casing of this invention is broken into when a compressive force is applied to it, the more even the subsequent reduction in the volume of the internal cavity of the casing. Accordingly, in a further preferred embodiment there are three longitudinal slots equally spaced about the casing, i.e. at intervals of 120° with a frangible wall section extending from the inner surface of the casing to the base of each slot. When a compressive force is applied such a casing is broken into three segments of equal size.

Where the casing has one or more slots, the frangible wall section located between the internal cavity and the base of each of the one or more slots prevents elastomeric material injected into the cavity entering the one or more slots whilst it is still viscous. In this embodiment, the range of suitable thicknesses for this wall section or sections varies according to the manufacturing conditions which will be encountered by the casing when forming a compressive joint. For example, the wall section or sections should be thick enough to prevent elastomeric material injected into the cavity entering into the one or more slots. However, if the wall section or sections are too thick they will not fracture correctly or at all when a compressive force is applied to the casing. Accordingly, the most appropriate thickness of the wall section or sections can depend upon such factors as the pressure at which the elastomeric material is injected into the cavity and the amount of compressive force which can be reasonably applied to the casing after the injection process. The most appropriate wall section thickness can be selected by the skilled technician to suit the manufacturing conditions. In a preferred embodiment where the casing is made of steel, the applicants have found that the preferred thicknesses of the frangible wall sections of such a casing are approximately 0.5 mm to 1.1 mm, more preferably approximately 0.6 mm to 1 mm and most preferably about 0.8 mm.

In a further preferred embodiment the casing is a cylinder and the internal cavity is a cylindrically shaped internal passage opening at both ends of the cylinder. In this embodiment the casing has an internal diameter i.e the diameter of the internal passage and an external diameter.

The one or more slots in the casing can be formed by making cuts in the outer surface of the casing using standard metal machining tools. The width of the one or more slots is varied to suit the amount of reduction sought in the volume of the internal cavity or passage of the casing. For example, the wider the one or more slots, the greater the reduction in this volume that can be achieved when a compressive force is applied to the casing. Preferred slot width is between about 2 to 4 mm, more preferably about 2.5 to 3.5 mm, and most preferably about 3 mm. Where the casing is an open ended cylinder as noted above the reduction in volume of the internal passage can be measured as the reduction in the internal diameter of casing. Preferably, at least a 5% reduction, more preferably a 6–8% reduction of the internal diameter is desired when the compressive force is applied to the outside of the casing.

Part of the inner surface of the casing i.e the surface of the internal cavity, may be spherically shaped to complement a connecting member having a part spherically shaped portion that is locatable inside the internal cavity. As noted earlier, a resilient joint having this feature is useful where the resilient joint is to damp forces applied along the axis of the connecting member as well as at an angle to this axis.

The present invention is also directed to a method of manufacturing an article for use in the manufacture of a resilient joint using the casing as hereinbefore described. Accordingly the present invention provides a method of manufacturing including:

taking the casing as hereinbefore described;
locating a connecting member within the internal cavity and;
introducing an elastomeric material into the internal cavity between the connecting member and inner surface of the casing to provide the article.

The final step in the formation of the resilient joint is to compress the casing of the article to cause the said at least one frangible wall section to fracture and to reduce the volume of the internal cavity of the casing in at least that portion filled with elastomeric material.

Preferably the volume of the internal cavity of the casing is reduced by such amount as is required to ensure that the elastomeric material is not in tension once it has cured.

Most elastomeric materials shrink by at least 2.5% on curing. Thus, It is preferred that the volume reduction be at least 2.5%. Most preferably, the elastomeric material is held under slight compression as the life of the material is better when in compression. Most preferably therefore, the volume of the internal cavity is reduced by more than 2.5%. It is preferred that the volume reduction be achieved by reducing the internal diameter of the casing by between 6 to 8%.

Preferably the connecting member is located within the central region of the cavity and the elastomeric material forms a sleeve around the connecting member. Where the casing has an internal cavity that is an internal passage open at both ends of the casing, part of the connecting member may extend beyond both ends of the casing. In this embodiment it is also preferred that the part of the connecting member located within the internal passage be partly spherical in shape and that a corresponding part of the surface of the internal passage be curved so to provide a substantially uniform spacing between the outer surface of the connecting member and the inner surface of the casing. This arrangement of the connecting member and outer casing allows the connecting member of the resilient joint to absorb forces transmitted to the member along the axis of the member and at an angle to the axis.

Preferably, the connecting member connects two points that can move relative to each other and the resilient joint acts to damp this movement.

It is preferred that the casing and connecting member be made from steel.

To assist in the bonding of the elastomeric material to the internal surface of the casing and the surface of the connecting member, it is preferable to treat these surfaces by grit blasting them and painting them with a bonding solution.

In a further preferred embodiment a sufficient amount of elastomeric material is placed in the internal cavity so that the entire volume of this cavity is occupied by the connecting member and elastomeric material.

The elastomeric material used in the method is preferably a natural or synthetic rubber compound. In a preferred embodiment the elastomeric material is injected into the internal cavity. This can be performed by using known injection equipment and under standard injection conditions that are well known to the skilled addressee.

A step of the method of this invention is to compressed the casing to cause each frangible wall section to fracture and subsequently for the volume of the cavity of the casing to reduce. In a preferred embodiment, a compressive force is applied to the outside of the casing and is applied by forcing the article, which includes the casing in combination with the connecting member and elastomeric material, through a passage of a structural member for accommodating the resilient joint, the size of the passage being less than the external size of the casing so as to place a compressive force on the casing. The structural member may be the housing that is to permanently accommodate the resilient joint, the size of the passage of the structural member being coincident with the external size of the casing that is sought after compression of the casing.

The compressive force can be applied to the casing before the elastomeric material has set. Alternatively, in a preferred embodiment of this invention the elastomeric material is allowed to cure and bond to the Inner surface of the casing and the connecting member before the step of applying the compressive force to the casing. As the elastomeric material cures it shrinks and goes into a state of tension. The preferred reduction in the volume of the internal cavity of the casing when the compressive force is applied to the casing causes a reduction In this tension in the elastomeric material. Most preferably, once the volume of the internal cavity has been reduced the elastomeric material is in compression.

Resilient joints of this invention are commonly used in railway car bogies providing a link between various components of the bogie such as the electric motor to the chassis of the bogie. The resilient joint is usually mounted within a housing in the bogie.

Where the casing has one or more longitudinal slots, increasing the width of the one or more slots in the casing allows a greater reduction In the volume of the internal cavity of the casing to be achieved when the casing is subjected to a compressive force. As previously indicated, in most cases it is desirable to reduce this volume to such an extent that the elastomeric material is placed in a state of compression after the casing has been compressed. Such a resilient joint is said to be "stiffer" than a resilient joint having elastomeric material that is not in a compressed state as a greater force is required to move the connecting member of a resilient joint having compressed elastomeric material component. The higher the load that the connecting member of the resilient joint is to bear, the greater the stiffness of the resilient joint that is required. Accordingly, by altering the width of the slots of the casing, it is possible to control the amount of reduction of the volume of the internal cavity of the casing on compressing the casing and consequently it is possible to control the resulting stiffness of the resilient joint In another embodiment, this invention is directed to an article for making a resilient joint and a resilient joint as described above.

The invention shall now be described with reference to the following figures which illustrate preferred embodiments of this invention:

BRIEF DESCRIPTION OF THE DRAWINGS

Turning to FIG. 1, the casing (1) has an outer surface (2), ends (3a–3b) and an internal passage (4). Three longitudinal slots are located in the casing and are designated (5a–5c). The slots extend along the length of the casing. Further, there is a frangible wall section (6a–6c) which extends from the Inside surface of the internal passage (4) to the base of each slot (5a–5c). The casing (1) has internal diameter (D1) and external diameter (D2).

FIG. 2 is a cross section along line II—II in FIG. 1, the cross section passing though slot (5a). As can be seen in FIG. 2, the surface (7) of the internal cavity (4) is partly curved. Slot (5a) has base (13). A frangible wall section (6a) extends from the internal passage (4) to the base (13) of slot 6a. As the surface (7) of the internal passage (4) is partly curved, the frangible wall section (6a) is similarly partly curved.

FIG. 3 is a perspective view of the casing (1) of this invention. In this figure a connecting member (8) has been located partly within the internal passage (4) of the casing (1), the connecting member (8) extending beyond ends (3a–3b) of the casing (1). Elastomeric material (9) has been injected into the internal passage (4) to occupy the space between connecting member (8) and the surface (7) (not shown in this figure) of internal passage (4). Accordingly the passage (4) is occupied by connecting member (8) and elastomeric material (9).

FIG. 4 is a cross sectional view taken along line IV—IV in FIG. 3. As can be seen in FIG. 4 the connecting member (8) is located within the internal passage (4) of casing (1), the connecting member (8) also extending beyond both ends (3a–3b) of casing (1). That part of the connecting member (8) located within the internal passage (4) is partly spherical in shape and this part is designated (10) in FIG. 4 Surface (7) of the internal passage (4) has a partly curved surface. Elastomeric material (9) is injected into the internal passage (4) to occupy the space between connecting member (8) and surface (7) of internal passage (4). Frangible wall sections (6a) and (6b–c) (not shown) prevent the escape of elastomeric material (9) into slot (5a) and slots (5b–c) (not shown). When the rubber has cured it bonds to the surfaces of the connecting member (8) and surface (7) of internal passage (4) and shrinks, thereby going into a state of tension.

FIG. 5 shows a resilient joint (11) formed by the method of this invention. The resilient joint (11) is formed by taking the article (17) comprising outer casing (1), connecting member (8) and rubber material (9) in combination as shown in FIGS. 3 and 4 and by applying a large enough compressive force to the outside of the casing (1) to cause the frangible wall sections (6a–6c) shown in FIG. 3 to fracture. A further compressive force is applied sufficient to cause segments (12a–12c) to move together thus closing slots (5a–5c) shown in FIGS. 1–4. This reduces the external diameter (D2) and the internal diameter (D1) of the casing (1). Consequently the casing has a new external diameter (D4) and internal diameter (D3) which are less than (D2) and (D1) respectively. This reduction in diameter reduces the tension in elastomeric material (9). The compressive forces required to fracture the frangible walls and to reduce the volume of the internal passage are preferably applied in a single step.

FIG. 6 is a perspective view of the resilient joint (11) of this invention mounted in a structural member (14) for housing the resilient joint (11). The structural member (14) has a passage (15) having a diameter of less than the diameter (D2) of the casing shown in FIG. 1. A compressive force is applied to the outside of the casing (1) by inserting the article (13), including the casing (1), connecting member (8) and elastomeric material (9), through the passage (15) in the structural member (14). The structural member (14) houses the resilient joint (11). The outer edges (16) of casing (1) are bevelled to facilitate such insertion.

Figure 1:
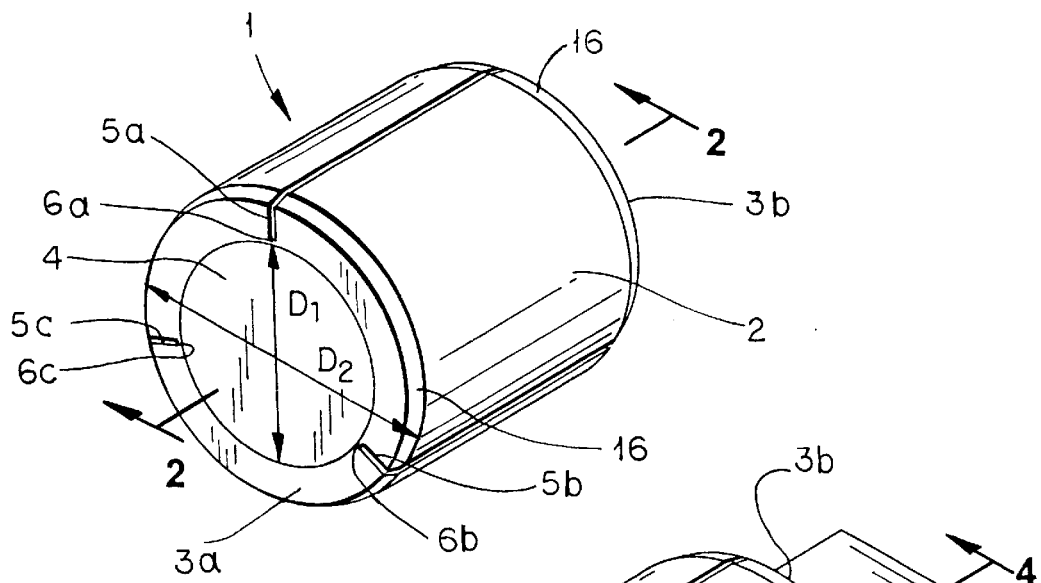
FIG. 1 is a perspective view of the casing of this invention.
Figure 3:
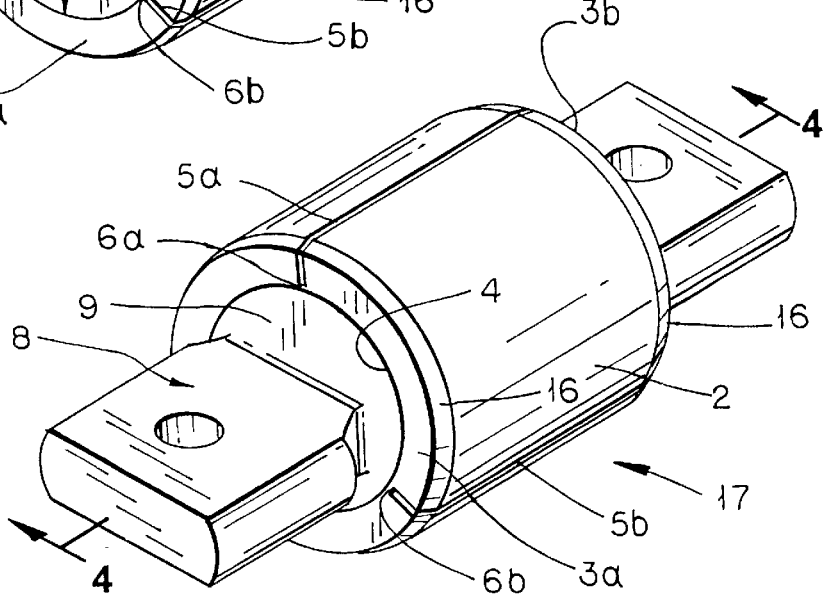
FIG. 3 is a perspective view of an article for forming a resilient joint.
Figure 5:
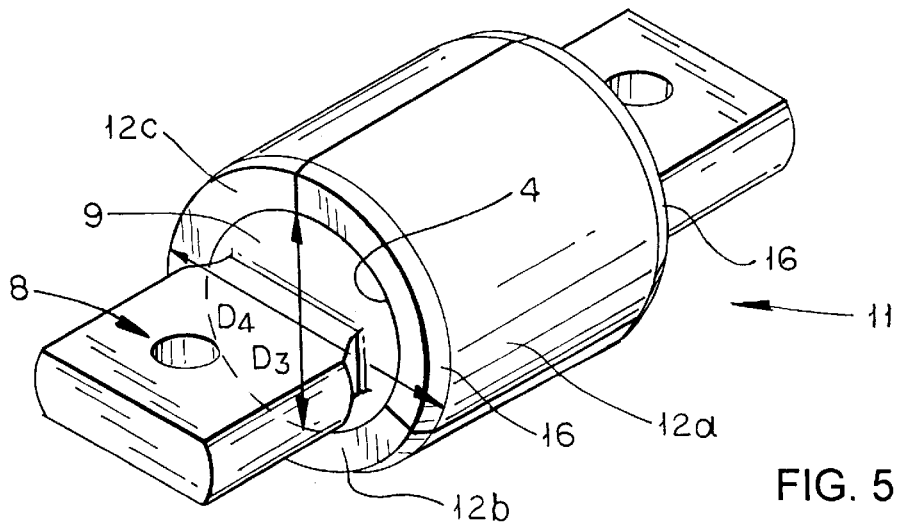
FIG. 5 is a perspective view of a resilient joint manufactured according to the method of this invention.
Figure 2:
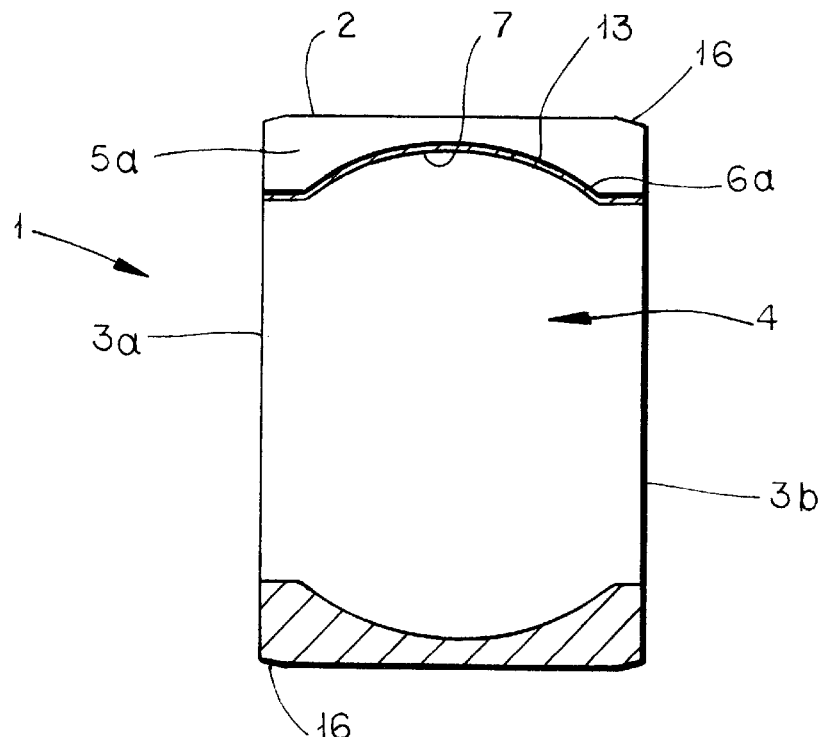
FIG. 2 is a cross section taken along FIG. II—II in FIG. 1.
Figure 4:
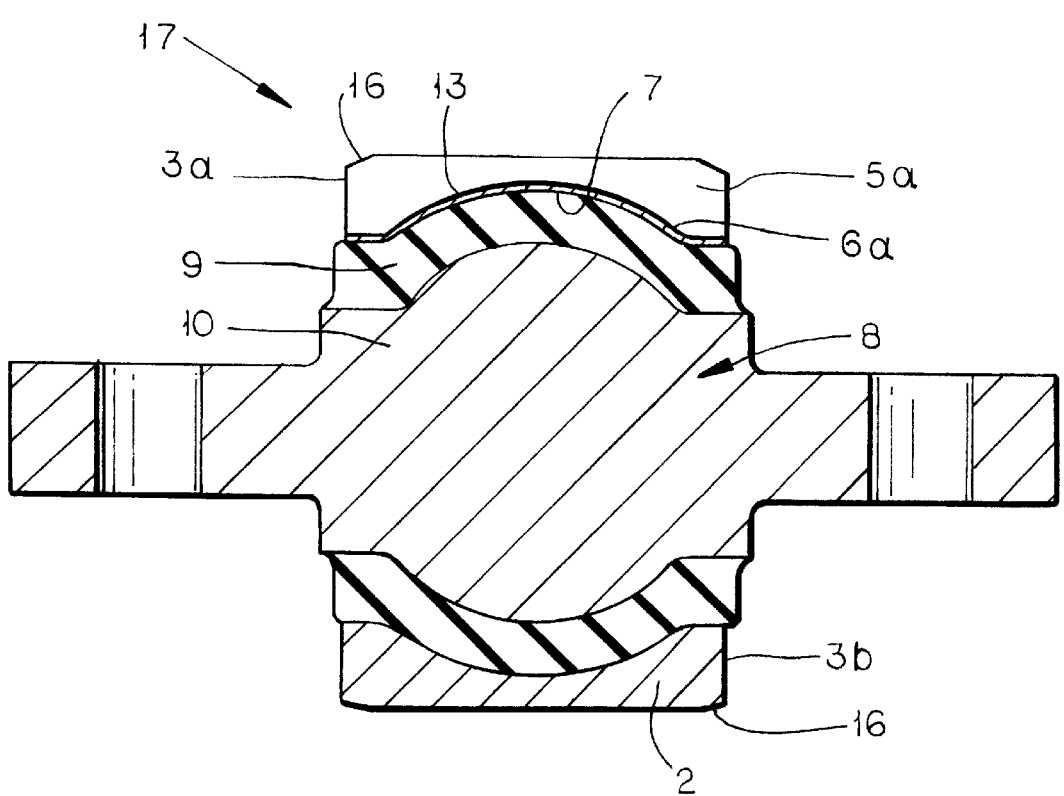
FIG. 4 is a cross section taken along line IV—IV in FIG. 3.
Figure 6:
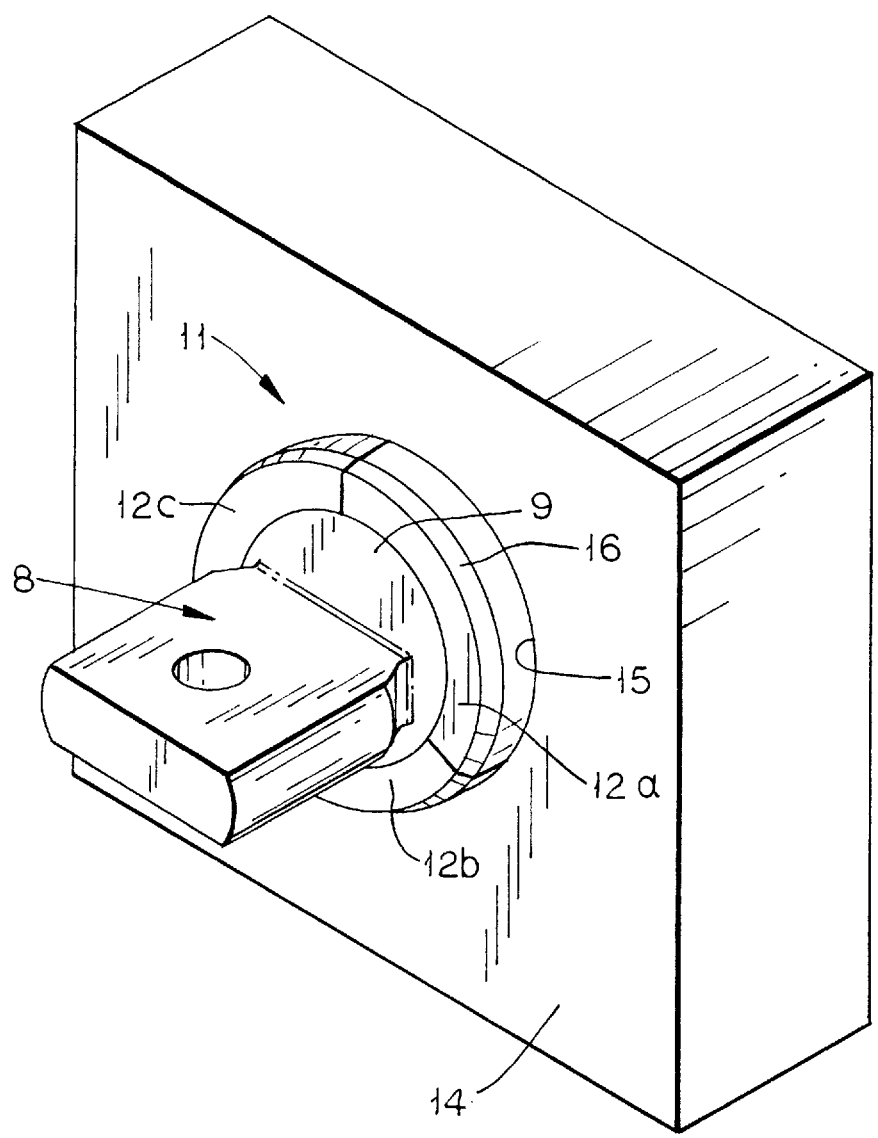
FIG. 6 is a perspective view of a structural member housing the resilient joint of this invention.

It will be appreciated from the foregoing that the present invention provides an outer casing for use in the manufacture of a resilient joint. The outer casing can be maintained as an integral unit as the various components that make up the resilient joint are assembled. Thereafter a compressive force can be applied to the casing and a reduction in the volume of the internal cavity of the casing can be achieved so that tension in the rubber component of the resilient joint can be reduced. Thus difficulties with the prior art device relating to the non integral form of the casing can be overcome.

It should be understood that various modifications and variations may be made to the casing of this invention and the method of manufacturing the resilient joint using this casing as hereinbefore described without departing from the spirit and ambit of the present invention.

We claim:

1. A method of manufacturing a resilient joint including:
providing a casing having an outer surface and an inner surface, the inner surface defining an internal cavity, wherein the casing has at least one frangible wall section which is adapted to fracture upon the application of a compressive force to the outer surface of the casing such that after such fracture the volume of the internal cavity of the casing is capable of being reduced;
locating a connecting member in the internal cavity of the casing;
introducing an elastomeric material into the internal cavity between the connecting member and inner surface of the casing;
compressing the casing to cause said at least one frangible wall section to fracture and thereby reduce
the volume of the internal cavity of the casing in at least that portion filled with elastomeric material.

2. A method according to claim 1 wherein the volume of the internal cavity is reduced by reducing the diameter of the internal cavity by more than 5%.

3. A method according to claim 1 wherein the diameter of the internal cavity is reduced by between 6 to 8%.

4. A method according to claim 1 wherein the compressive force is applied to the casing after the elastomeric material has cured and bonded to the inner surface of the casing and the connecting member, the elastomeric material having gone into a state of tension and the reduction in said volume of the internal cavity is sufficient to reduce the tension in the elastomeric material.

5. A method according to claim 1 wherein the casing is compressed by inserting the combined casing, connecting member and elastomeric material through a passage in a structural member for accommodating the casing wherein the size of the passage is coincident with an external size of the casing that is sought.

6. A method according to claim 1 wherein the elastomeric material is injected into the internal cavity.

7. A resilient joint formed by the method of claim 1.

8. A method according to claim 1 wherein the volume of the internal cavity is reduced by reducing the diameter of the internal cavity by more than 2.5%.

9. A method according to claim 1 wherein the casing is compressed after the elastomeric material has cured and bonded to the inner surface of the casing and the connecting member, the elastomeric material having gone into a state of tension and the reduction in said volume of the internal cavity is such as to reduce the tension in the elastomeric material.

10. A method of manufacturing a resilient joint including:
providing a casing having an outer surface and an inner surface and a first end and a second end, the inner surface defining an internal passage extending from the first end to the second end, three slots equally spaced about the casing in the outer surface and extending from the first end to the second end, each slot having a base and a frangible wall section, each frangible wall section extending from the inner surface of the casing to the base of the respective slot wherein the frangible wall sections are adapted to fracture upon the application of a compressive force to the outer surface of the casing such that after such fracture the casing comprises three segments and the volume of the internal passage is capable of being reduced;
locating a connecting member in the internal passage of the casing;
introducing an elastomeric material into the internal passage between the connecting member and the inner surface of the casing; and
compressing the casing to cause the three frangible wall sections to fracture and thereby reduce
the volume of the internal passage of the casing in at least that portion filled with elastomeric material.

11. A method according to claim 10 wherein the volume of the internal passage is reduced by reducing the diameter of the internal passage by more than 5%.

12. A method according to claim 11 wherein the diameter of the internal passage is reduced by between 6 to 8%.

13. A method according to claim 10 wherein the casing is compressed after the elastomeric material has cured and bonded to the inner surface of the casing and the connecting member, the elastomeric material having gone into a state of tension and the reduction in said volume of the internal passage is sufficient to reduce the tension in the elastomeric material.

14. A method according to claim 10 wherein the casing is compressed by inserting the combined casing, connecting member and elastomeric material through a passage in a structural member for accommodating the resilient joint, wherein the size of the passage is coincident with an external size of the casing that is sought.

15. A method according to claim 10 wherein the elastomeric material is injected into the internal passage.

16. A method according to claim 10 characterised in that the casing is a cylinder, part of the internal passage is spherically shaped and part of the connecting member located within the internal passage is spherically shaped.

17. An intermediate article for use in manufacturing a resilient joint including;
a casing having an inner surface defining an internal space, an outer surface, first and second ends, and at least one slot in the outer surface extending from the first end to the second end, said at least one slot having a base and a frangible wall section extending from the base of the at least one slot to the inner surface;
a connecting member located at least partially within the internal space of the casing and spaced from the inner surface of the casing, and
elastomeric material located within the internal space which is located between and bonded to the connecting member and inner surface of the casing, so that the internal space is occupied by the connecting member and the elastomeric material;
wherein the frangible wall section is breakable upon the application of a compressive force to the casing to reduce the volume of the internal space.

18. An article according to claim 17 wherein the casing has three slots equally spaced about the casing, each slot having a base and a frangible wall section, each frangible wall section extending from the inner surface of the casing to the base of the respective slot, whereupon fracture of the frangible wall sections results in the casing comprising three segments.

19. An article according to claim 17 wherein the elastomeric material is in a state of tension.

20. An article according to claim 17 wherein the internal space has been reduced by more than 2.5% upon the application of a compressive force.

21. An article according to claim 20 wherein the internal space has been reduced by more than 5.0% upon the application of a compressive force.

22. An article according to claim 17 wherein the casing is cylindrical and part of the internal space is spherically shaped.

23. An article according to claim 17 wherein the connecting member extends beyond the first and second ends of the casing and part of the connecting member located within the internal space is spherically shaped.

24. An article according to claim 17 wherein each slot is 2.5 to 3.5 mm in width and each frangible wall section is 0.5 to 1.1 mm in thickness.

* * * * *